(12) United States Patent
Kashiwagi (10) Patent No.: US 7,748,730 B2
(45) Date of Patent: Jul. 6, 2010

(54) AIRBAG SYSTEM (75) Inventor: Daisuke Kashiwagi, Tokyo (JP)

(73) Assignee: Takata Corporation, Tokyo (JP)

( * ) Notice: Subject to any disclaimer, the term of this patent is extended or adjusted under 35 U.S.C. 154(b) by 267 days.

(21) Appl. No.: 11/584,673

(22) Filed: Oct. 23, 2006

(65) Prior Publication Data
US 2007/0096439 A1 May 3, 2007

(30) Foreign Application Priority Data
Nov. 2, 2005 (JP) .............................. 2005-319876

(51) Int. Cl.
B60R 21/20 (2006.01)
B60R 21/217 (2006.01)

(52) U.S. Cl. ................. 280/728.2; 280/729; 280/730.1; 280/732; 280/736; 280/739; 280/741; 280/743.1

(58) Field of Classification Search ............. 280/728.2, 280/730.1, 732, 736, 743.1, 729, 739, 741
See application file for complete search history.

(56) References Cited

U.S. PATENT DOCUMENTS

| | | | |
|---|---|---|---|
| 5,667,241 A * | 9/1997 | Bunker et al. ............ | 280/730.2 |
| 5,833,266 A * | 11/1998 | Bartoldus et al. ......... | 280/743.1 |
| 7,025,164 B2 * | 4/2006 | Takimoto ................... | 180/274 |
| 2002/0190509 A1 | 12/2002 | Higashi | |
| 2003/0067144 A1 * | 4/2003 | Lincoln et al. ........... | 280/728.2 |
| 2004/0113399 A1 * | 6/2004 | Yoshikawa et al. ....... | 280/730.1 |
| 2005/0052009 A1 | 3/2005 | Abe | |
| 2005/0110244 A1 | 5/2005 | Wheelwright et al. | |
| 2005/0189741 A1 * | 9/2005 | Abe et al. ................ | 280/730.1 |
| 2006/0108775 A1 * | 5/2006 | Schirholz et al. ......... | 280/728.2 |
| 2006/0108780 A1 * | 5/2006 | Hotta et al. .................. | 280/732 |

FOREIGN PATENT DOCUMENTS

| | | |
|---|---|---|
| DE | 298 07 424 U1 | 10/1998 |
| EP | 1 300 300 A1 | 7/2001 |
| EP | 1 262 378 | 5/2002 |
| EP | 1 510 420 A2 | 3/2004 |
| EP | 1 514 742 A1 | 7/2004 |
| EP | 1 518 762 A1 | 9/2004 |
| JP | H110115673 | 4/1999 |

* cited by examiner

*Primary Examiner*—Paul N. Dickson
*Assistant Examiner*—Barry Gooden, Jr.
(74) *Attorney, Agent, or Firm*—Manabu Kanesaka (57) ABSTRACT Deployment performance of an airbag may be improved by improving an air tightness of an leg airbag system that includes a knee airbag for restraining occupant's legs and a gas generator that generates a jet of gas to inflate the knee airbag. An end of the gas generator is connected to a gas generator ignition control cable and passes through an insertion opening. The insertion opening has an area smaller than a cross section area of the end of the gas generator.

10 Claims, 6 Drawing Sheets

This Invention

Fig. 7B   Prior Art

Comparative Example

AIRBAG SYSTEM

BACKGROUND OF THE INVENTION AND RELATED ART STATEMENT

The present invention relates to an airbag system mounted to a vehicle, such as a car, and specifically relates to a leg airbag system.

Various airbag systems are known to restrain occupants' bodies in a car collision, and include a driver airbag system that inflates and deploys from the rotational center of the steering wheel toward a driver seated in a driver seat. Such systems also include a passenger airbag that inflates and deploys from an instrument panel toward a passenger seat.

One airbag system includes a leg airbag system for preventing occupants' legs from colliding in a collision with, for example, an interior panel in front of the seat, and for restraining the vicinity of the knees in order to prevent movement of the lower half of the occupants' bodies toward the front of the vehicle.

The leg airbag system generally includes an airbag disposed inside the interior panel (in the space on the back of the interior panel), a gas generator for inflating the airbag, and a lid that covers the airbag normally (when the high-speed mobile unit such as a car is not in a collision).

Such a leg airbag system is generally constructed such that the airbag is disposed in a folded state inside the interior panel, and the lid is mounted so as to cover the folded airbag. When a car, for example, collides head-on with an object, the gas generator generates a jet of gas. The gas is supplied to the airbag to open the lid with the inflation of the airbag permitting the airbag to inflate towards the exterior of the interior panel. Deploying between the interior panel and the lower legs of the occupant, the airbag prevents the occupant's lower legs from striking against the interior panel (hereinafter, this type of airbag that inflates forward of occupant's legs is referred to as a knee airbag).

Japanese Unexamined Patent Application Publication No. 2005-82025 ("Patent Document 1") discloses a leg airbag system that includes a knee airbag and a gas generator, substantially disposed in the knee airbag, projects to an exterior of the airbag through a slit-like insertion opening of the knee airbag. Patent Document 1 further discloses an ignition control connector connected to the externally projecting end of the gas generator.

Patent Document 1 further discloses the basic structure of a leg airbag system including a knee airbag and a gas generator that passes through the insertion opening of the knee airbag.

In order to optimize an airbag system, a leg airbag system is still required to have improved airtightness and deployment performance.

Accordingly, it is an object of the present invention to provide an airbag system in which the deployment performance of an airbag can be improved by improvement in airtightness characteristic of the airbag.

Further objects and advantages of the invention are apparent from the following description of the invention.

SUMMARY OF THE INVENTION

In order to achieve the above object, according to a first aspect, an airbag system includes an airbag for restraining an occupant and a gas generator that generates a jet of gas to inflate the airbag. The area of an insertion opening of the airbag for the gas generator to pass through is smaller than the cross section of the gas generator.

According to the first aspect of the disclosure, the gas generator is passed through the insertion opening of the airbag with the gas generator housed in the airbag, and the end of the gas generator connecting to the gas-generator ignition control cable is exposed to the exterior of the airbag. The area of the generator insertion opening is set smaller than the cross section of the gas generator. Thus, the gas generator is tightly fitted in the airbag to prevent the formation of clearance between the inner rim of the insertion opening and the outer periphery of the gas generator. Accordingly, the air tightness of the airbag can be improved. This prevents gas leakage through the clearance during inflation and deployment, thereby improving the deployment performance of the airbag. Furthermore, because the airbag can be deployed by a relatively low-output gas generator, the gas generator can be made compact.

According to a second aspect of the disclosure, the gas-generator insertion opening of the first invention is circular in shape.

According to the second aspect, the end of the gas generator connecting to the gas-generator ignition control cable is passed through the insertion opening of the airbag, and the end is exposed to the exterior of the airbag. According to the second aspect, the insertion opening through which the end of the gas generator passes through is circular in shape. Thus, for a circular cross-section gas generator, a clearance between the inner rim of the insertion opening and an outer periphery of the gas generator can be further prevented. As a result, the air tightness of the airbag can be further improved.

According to a third aspect, the insertion opening of the second aspect is configured to allow the end of the gas generator, connected to the gas-generator ignition control cable, to pass through.

Thus, the end of the gas generator, housed in the airbag and connected to the gas-generator ignition control cable, is passed through the insertion opening of the airbag, and the end of the gas generator may be exposed to the exterior of the airbag and connected to the ignition control cable.

According to a fourth aspect, a periphery of the insertion opening of the first aspect is sewn up in a circle.

Thus, the periphery (inner rim) of the circular insertion opening may be reinforced.

In order to achieve the above object, a fifth aspect uses the airbag system of the first aspect.

Thus, based upon the above disclosures, the air tightness of the knee airbag can be improved. Accordingly, gas is prevented from leaking through the clearance during inflation and deployment, thereby improving the deployment performance of the knee airbag. Furthermore, since the knee airbag can be deployed by a relatively low-output gas generator, the gas generator can be made compact.

According to the invention, the deployment performance of an airbag can be improved by improvement in air tightness.

BRIEF DESCRIPTION OF THE DRAWINGS

FIGS. 7A and 7B are conceptual diagrams of a state in which the end of the gas generator adjacent to a connector passes through the insertion opening, wherein

DETAILED DESCRIPTION OF PREFERRED EMBODIMENTS

An embodiment based upon the present disclosure is described with reference to the drawings. The embodiment is an example of application of the present disclosure to a leg airbag system including an airbag (hereinafter, referred to as a knee airbag) that inflates forward of occupants' legs in a collision.

Figure 1:
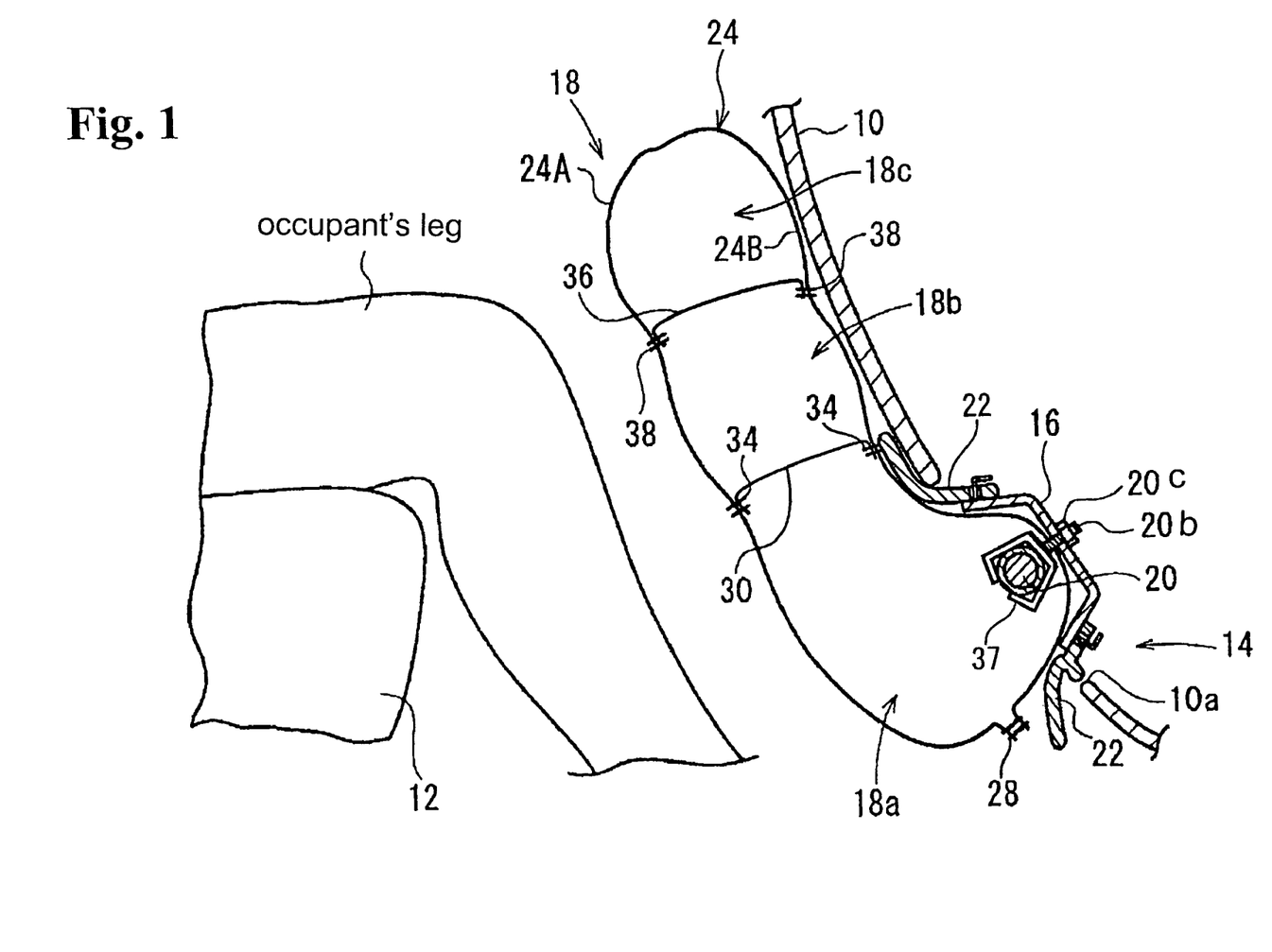
FIG. 1 is a sectional view of the vicinity in front of a vehicle seat showing the inflating state of a knee airbag of a leg airbag system.
Figure 2:
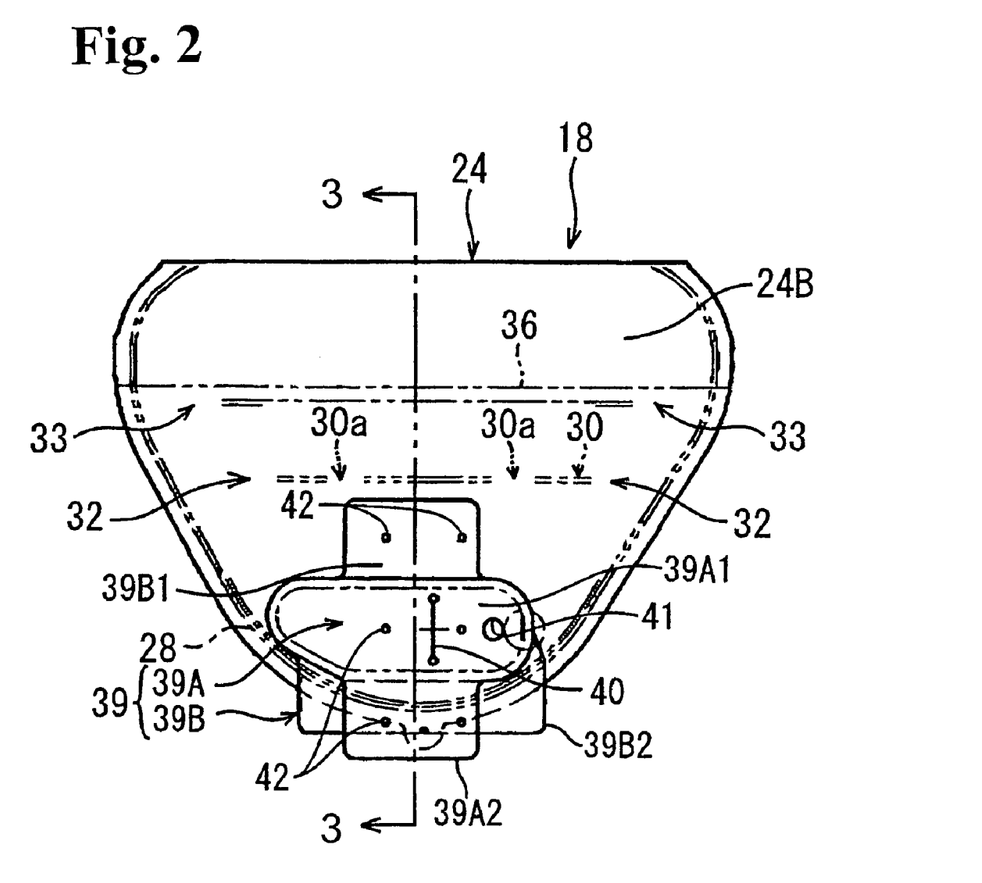
FIG. 2 is a front view (plan view) of the knee airbag of the leg airbag system as viewed from the interior panel, according to the leg airbag system of FIG. 1.
Figure 3:
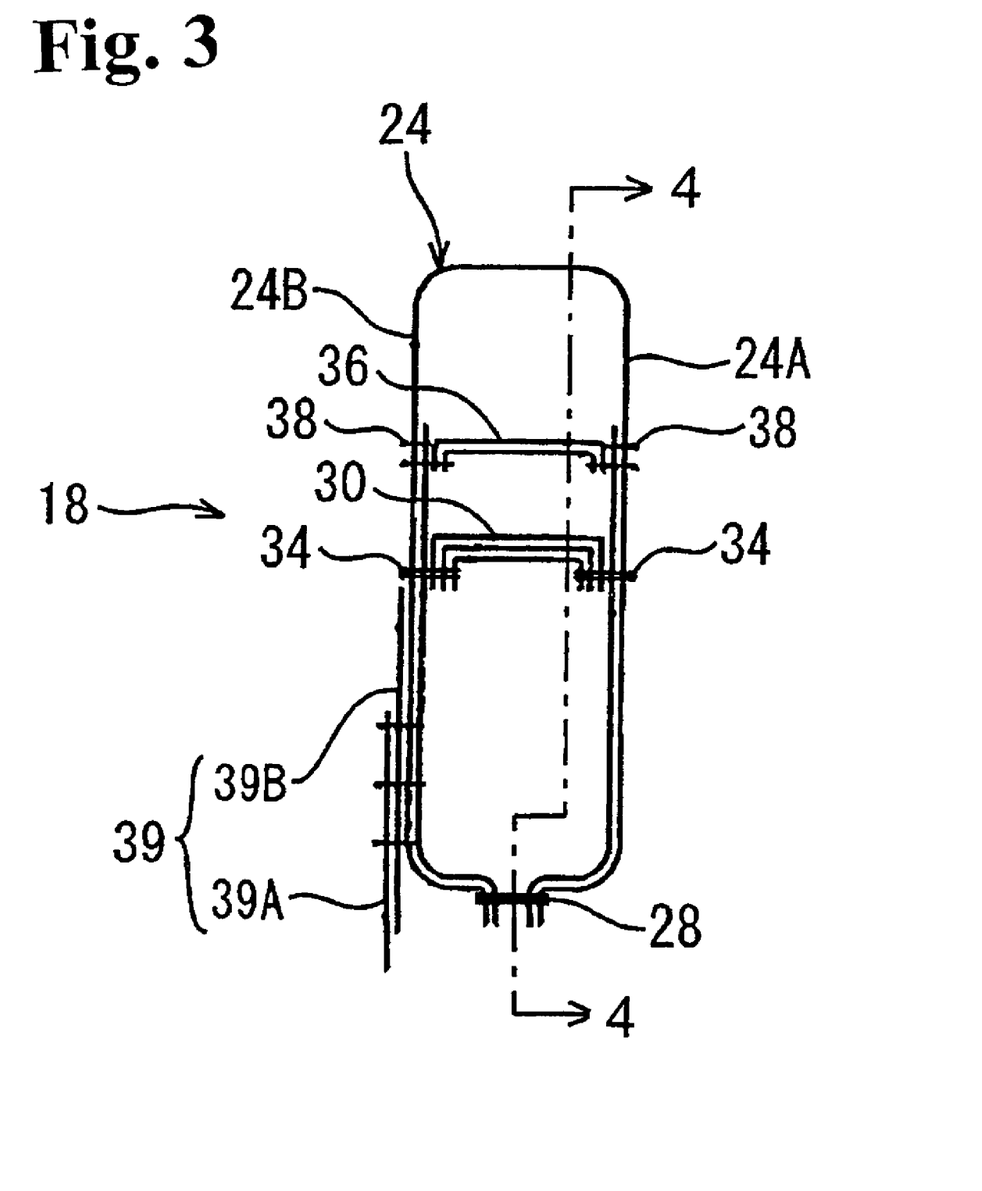
FIG. 3 is a sectional view taken along line 3-3 of FIG. 2.
Figure 4:
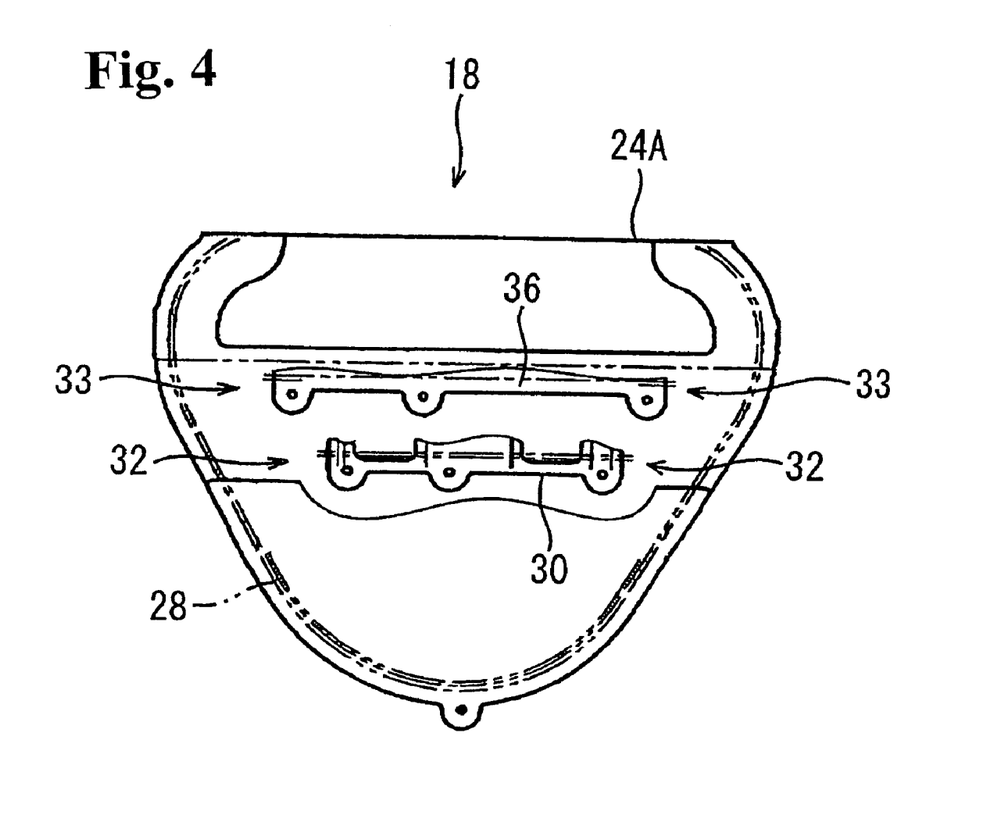
FIG. 4 is a cross-sectional view taken along line 4-4 of FIG. 3.
Figure 5:
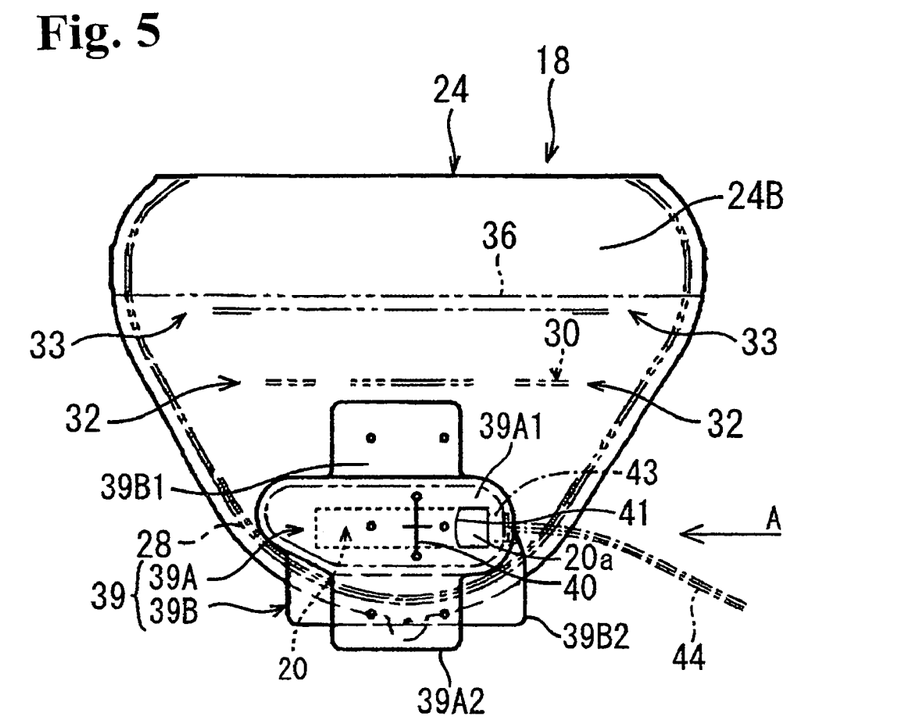
FIG. 5 is a front view of the knee airbag in a state in which a gas generator is housed in a gas-generator housing portion.
Figure 6:
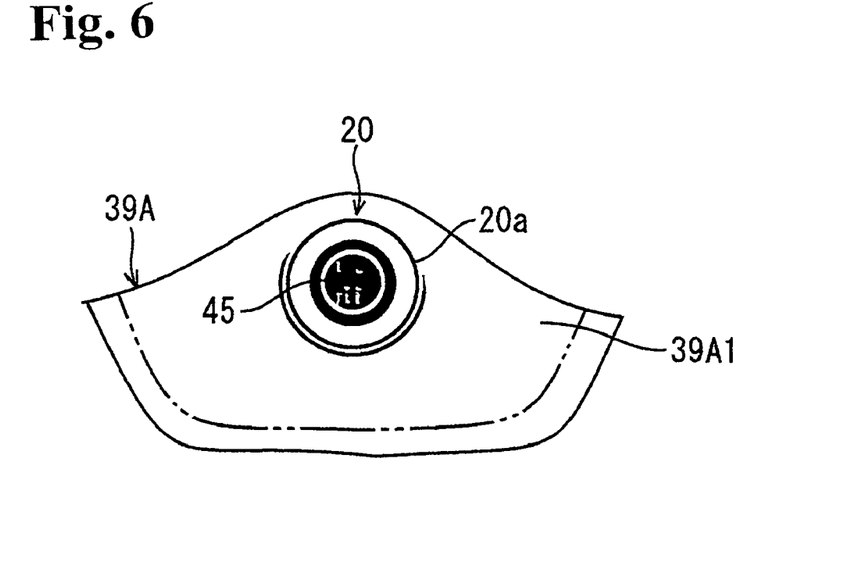
FIG. 6 is a diagram of the gas generator insertion opening according to FIG. 5, viewed from arrow A.
Figure 7A:
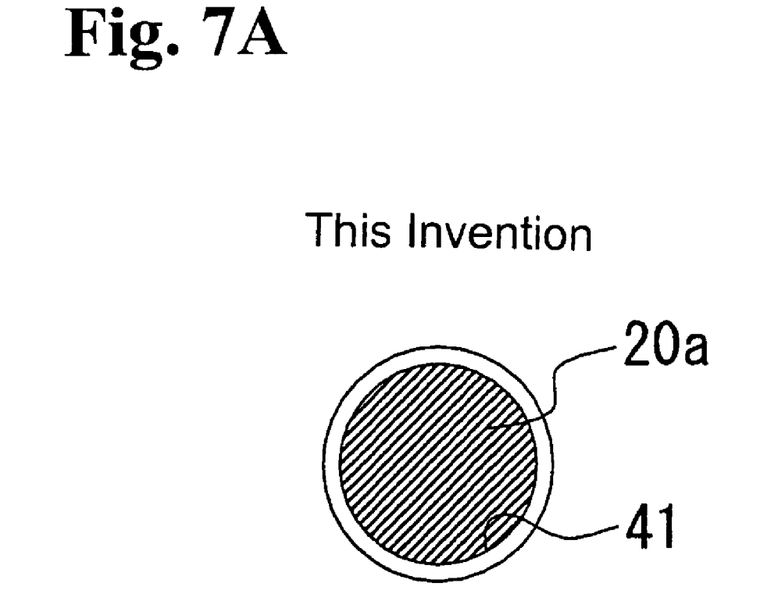
FIG. 7A is a conceptual diagram of the insertion state of the embodiment.

FIG. 1 is a sectional view of the vicinity in front of a vehicle seat, showing the inflating state of a knee airbag of a leg airbag system according to an embodiment of the present disclosure. FIG. 2 is a front view (plan view) of the knee airbag viewed from an interior panel. FIG. 3 is a sectional view taken along line 3-3 of FIG. 2. FIG. 4 is a cross-sectional view taken along line 4-4 of FIG. 3. FIG. 5 is a front view of the knee airbag in a state in which a gas generator is housed in a gas-generator housing section. FIG. 6 is a diagram of the gas-generator insertion opening in FIG. 5, viewed from arrow A. FIG. 7A is a conceptual diagram of a state in which the end of the gas generator adjacent to a connector passes through the insertion opening.

According to FIG. 1, a leg airbag system 14 is mounted to an interior panel 10 serving as an interior trim member in front of a seat 12.

The leg airbag system 14 (an airbag system) includes a container-like retainer 16, a knee airbag 18 (airbag) connected to the interior of the retainer 16, and a gas generator 20 for inflating the knee airbag 18. The retainer 16 is disposed in an opening 10a of the interior panel 10. The knee airbag 18 is usually accommodated in a folded state in the retainer 16. A lid 22 is mounted to the front surface of the retainer 16 such that it covers the knee airbag 18. The lid 22 is usually disposed substantially inside the interior panel 10; when the knee airbag 18 inflates, the lid 22 is open to the front face of the interior panel 10 with the upper and lower ends as fulcrum.

The opening 10a is provided at a height equal to or lower than the seating face of the seat 12. The knee airbag 18 inflates from below upward along the front surface of the interior panel 10 (the surface adjacent to the occupant) through the opening 10a during inflation.

The outer shell of the knee airbag 18 is constructed of one panel 24 having an occupant-side front panel 24A and a rear panel 24B adjacent to the interior panel 10. Referring to FIG. 2, in some aspects, the panel 24 is constructed such that the front panel 24A and the rear panel 24B substantially triangular in shape and of the same size are connected together. The panel 24 is folded back at the joint portion, and the respective rims of the front panel 24A and the rear panel 24B, except for the joint portion, are joined together with connecting means, such as sewing, and are formed into a bag. Reference numeral 28 indicates a seam of sewing thread or the like that stitches up the rims. One surface of the front panel 24A and the rear panel 24B is coated with silicone, and are disposed inside in the form of a bag.

Referring to FIG. 1, the knee airbag 18 has two belt-like tethers 30 and 36 sewn therein for preventing an increase in the thickness of the airbag 18 during inflation and deployment. The first tether 30 is disposed upstream of the gas flow from the gas generator 20. The crosswise opposite ends of the first tether 30 and the facing inner surfaces of the knee airbag 18 are stitched up with a sewing thread 34. The second tether 36 is disposed downstream of the gas flow, the tether's crosswise opposite ends and the facing inner surfaces of the knee airbag 18 are also stitched up with the sewing thread 38. As shown in FIGS. 2 and 4, the first tether 30 and the second tether 36 are disposed substantially in the lateral direction (in the vehicle width direction) of the knee airbag 18 to form a first chamber 18a, a second chamber 18b, and a third chamber 18c in the knee airbag 18 in that order from the upper stream of the gas flow (see FIG. 1).

Channels 32 and 33 allow the gas from the gas generator 20 to pass through and are disposed on the opposite ends of the length direction of the first tether 30 and the second tether 36, respectively. The channel 32 communicates the first chamber 18a and the second chamber 18b with each other, while the channel 33 communicates the second chamber 18b and the third chamber 18c with each other. The first tether 30 has at least one (two in this embodiment) channel 30a for the gas from the gas generator 20 to pass through.

The knee airbag 18 has a gas-generator housing section 39 at the lower part. The gas-generator housing section 39 has a housing bag 39A for housing the gas generator 20 and a protective fabric 39B disposed between the housing bag 39A and the rear panel 24B, and is sewn to the knee airbag 18. The housing bag 39A communicates with the knee airbag 18, and includes a housing section 39A1 configured to house the gas generator 20 and further includes a cover 39A2 integrated with the housing section 39A1 to improve the air tightness of the housing section 39A1 (in other words, to improve the air tightness of the knee airbag 18). The cover 39A2 is disposed on one side of a slit 40, to be described later, (below in FIG. 2), which is folded back from the one side toward the slit 40 (upward in FIG. 2) to cover the slit 40 from the one side.

The housing section 39A1 has the slit 40 (second insertion opening) allowing the gas generator 20 to be taken in and out therethrough and includes an insertion opening 41 for an end 20a of the gas generator 20 adjacent to a connector (see FIGS. 5 and 6) to expose to the exterior after being housed. The gas-generator end 20a exposed to the exterior through the insertion opening 41 has a connector joint portion 45 (see FIG. 6), to which a cable 44 for controlling the ignition of the gas generator 20 is connected via the connector 43 (see FIGS. 5 and 6).

The insertion opening 41 may be circular in shape, and whose opening area is set smaller than a cross section of the end 20a of the gas generator 20 (a cross section perpendicular to the axis of the gas generator 20). The opening area here denotes the area of the insertion opening 41 in a flatly developed state. In other words, the diameter of the insertion opening 41 is set smaller than that of the gas-generator end 20a. For example, supposing that the diameter of the gas-generator end 20a is 25 mm, the diameter of the insertion opening 41 may be set to about 22 mm. Thus, as shown in FIGS. 5 and 6, when the gas-generator end 20a is passed through the insertion opening 41, the gas generator 20 is tightly fitted in the housing section 39A1 of the housing bag 39A to prevent the formation of clearance between the inner rim of the insertion opening 41 and the outer periphery of the gas-generator end 20a. The gas-generator end 20a is inserted into the insertion opening 41 by using the flexibility of the fabric of the housing bag 39A. In some embodiments, the periphery (inner rim) of the circular insertion opening 41 may be stitched for reinforcement.

The protective fabric 39B may include a cover 39B1 operable to improve the airtightness of the knee airbag 18 similar to the cover 39A2 of the housing bag 39A. Along with cover 39B1, an integral protective portion 39B2 is provided for protecting the knee airbag 18 from the corner (edge) of the retainer 16 at inflation. The cover 39B1 is disposed on the other side of the slit 40 (upward in FIG. 2), and is folded back from the other side toward the slit 40 (downward in FIG. 2) to cover the slit 40 from the other side.

In accommodating the gas generator 20 in this gas-generator housing section 39, the gas generator 20 is first accommodated in the housing section 39A1 of the housing bag 39A through the slit 40. The cover 39B1 of the protective fabric 39B is then folded back toward the slit 40 so as to cover the slit 40. The cover 39A2 of the housing bag 39A is then folded back to the slit 40 so as to further cover the cover 39B1 that covers the slit 40. Thus, the slit 40 is covered double with the covers 39B1 and 39A2 in layers to improve the air tightness of the knee airbag 18. The gas-generator housing section 39 is not shown in FIG. 1.

The gas generator 20 may be substantially cylindrical in shape, and is housed in the housing section 39A1 of the housing bag 39A with the cylindrical axis direction substantially in the vehicle width direction in a state in which it is retained by a metallic gas-generator retaining member 37 (see FIG. 1). The gas generator 20 generates a jet of gas formed as a result of a reaction of a gas-generating agent using heat from ignited powder. The ignition is controlled by a control unit (not shown) connected to the gas generator 20 via the connector 43 and the cable 44 (see FIG. 5). As shown in FIG. 1, stud bolts 20b project from the side circumferential surface of the gas-generator retaining member 37 that retains the gas generator 20. The stud bolts 20b are passed through bolt insertion openings (openings) in the housing section 39A1 and the cover 39A2 of the housing bag 39A and the cover 39B1 of the protective fabric 39B and a bolt insertion opening (not shown) in the bottom of the retainer 16, on which nuts 20c are tightened to fix the gas generator 20 and the gas-generator retaining member 37 to the retainer 16. The rear panel 24B of the knee airbag 18 is retained to the retainer 16 in such a manner as to be clamped between the gas generator 20 and the gas-generator retaining member 37 and the bottom of the retainer 16.

Although it is not explained, the first tether 30, the second tether 36, and the gas-generator housing section 39 may be made of the same material as that of the knee airbag 18 (or the panel 24).

The disclosed leg airbag system 14 activates the gas generator 20 in a vehicle collision to generate knee-airbag inflating gas. The gas is supplied into the first chamber 18a to inflate it first. At that time, the inflation of the first chamber 18a allows the lid 22 to open to both sides. The gas in the first chamber 18a then flows into the second chamber 18b through the channels 30a of the first tether 30 and the channels 32, causing the second chamber 18b to inflate. The gas in the second chamber 18b then flows into the third chamber 18c through the channels 33, inflating the third chamber 18c. Thus, the knee airbag 18 is inflated and deployed.

The disclosed leg airbag system 14 has the following advantages.

In some aspects, the leg airbag system 14 is provided with the gas generator 20 housed in the knee airbag 18. An end 20a of the gas generator 20 is connected to the gas-generator ignition control cable 44 and is passed through the insertion opening 41 of the knee airbag 18. The end 20a is exposed to the exterior of the knee airbag 18.

In some embodiments, the insertion opening 41 for the gas-generator end 20a is circular in shape, wherein the insertion opening area is set smaller than the cross section of the gas-generator end 20a. Thus, the substantially cylindrical gas-generator end 20a is tightly fitted in the housing section 39A1 of the housing bag 39A to prevent the formation of clearance between the inner rim of the insertion opening 41 and the outer periphery of the gas-generator end 20a, thereby improving the air tightness of the knee airbag 18. An improvement in air tightness prevents gas leakage through the clearance during inflation and deployment, and thereby improving the deployment performance of the knee airbag 18. Furthermore, since the knee airbag 18 can be deployed by the relatively low-output gas generator 20, the gas generator 20 can be made compact.

The disclosed embodiments provide the advantages of improving assembly performance and productivity in addition to the improvement in air tightness. The advantages will be described below with reference to the comparative example in which the insertion opening 41 is in the form of slit.

Figure 7B:
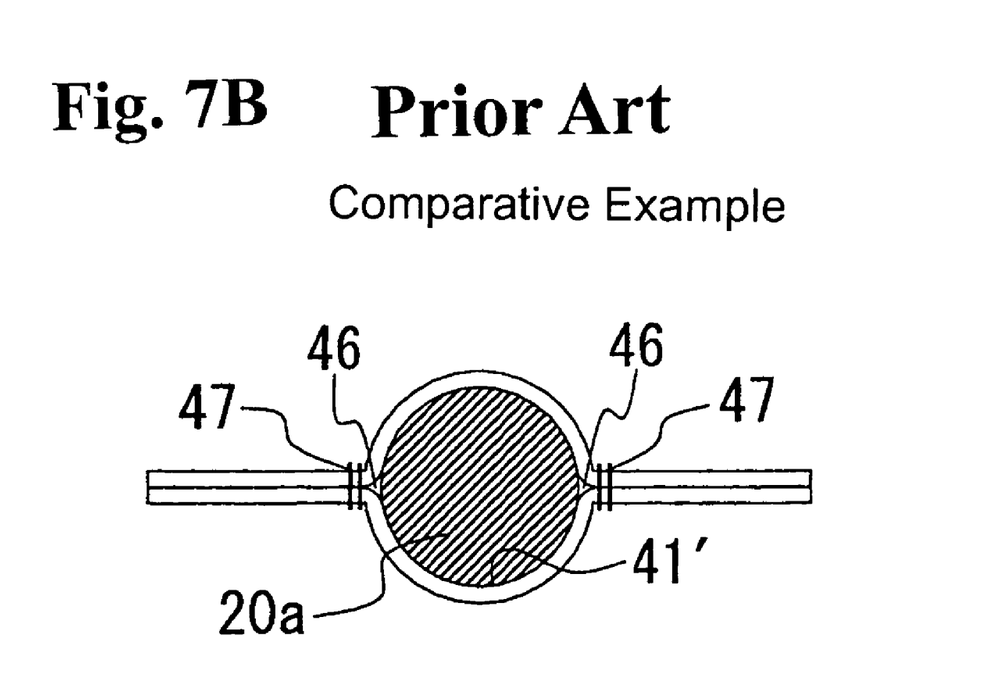
FIG. 7B is a conceptual diagram of the insertion state of the comparative example.

FIG. 7 is a conceptual diagram of a state in which the end 20a of the gas generator 20 adjacent to the connector passes through the insertion opening. FIG. 7A is a conceptual diagram of the insertion state of the embodiment, and FIG. 7B is a conceptual diagram of the insertion state of the comparative example.

As shown in FIG. 7A, the insertion opening 41 may be circular in shape and comprise an opening area set smaller than a cross section of gas-generator end 20a. This relationship prevents the formation of clearance between the inner rim of the insertion opening 41 and the outer periphery of the gas-generator end 20a in an inserted state. In contrast, FIG. 7B illustrates an insertion opening 41' in the form of slit, wherein clearances 46 may be formed on both ends of the gas-generator end 20a in an inserted state. Thus, the embodiment provides higher air tightness than the comparative example.

In the comparative example of FIG. 7B, when the gas generator 20 is mounted to the knee airbag 18 (in other words, the end 20a of the gas generator 20 housed in the housing section 39A1 of the housing bag 39A is exposed to the exterior through the insertion opening 41'), the end 20a must be passed through the slit-like insertion opening 41' after being expanded to open. In contrast, since the disclosed embodiment of FIG. 7A has the circular insertion opening 41, the time and labor to expand and open the slit at insertion can be omitted. Thus, the embodiment provides higher assembly performance than the comparative example.

In the comparative example of FIG. 7B, because the insertion opening 41' has the form of slit, the construction can be thought as an example such that the both ends is sewn up to decrease the clearance after the gas generator 20 is passed therethrough in order to improve the airtightness to a maximum extent, as shown in the drawing. Numeral 47 in FIG. 7B indicates the seam. In contrast, the insertion opening 41 of the embodiment of FIG. 7A is circular in shape and comprises a small opening area. Thus, there is no need for sewing after the insertion of the gas generator end 20a, eliminating the need for a sewing process when mounting the gas generator 20, thereby improving the productivity of the airbag system, and decreasing the cost.

The disclosed leg airbag system 14 includes the slit 40 for inserting the gas generator 20 in and out from the housing bag 39A, in addition to the insertion opening 41, which allows the end 20a of the gas generator 20, adjacent to the connector, to be exposed to the exterior. Thus, the gas generator 20 can easily be housed in the housing section 39A1 through the slit 40.

As disclosed, slit 40 of the leg airbag system 14 comprises an insertion opening for installing and removing the gas generator 20 t from the housing bag 39A. The slit-shaped insertion opening can be expanded at the insertion of the gas generator 20 to provide sufficient opening to pass the gas generator 20 therethrough. Furthermore, the slit 40 may be closed after the insertion to minimize the opening space, thereby preventing a decrease in the air tightness of the knee airbag 18.

While the invention has been described with the airbag 18 containing two tethers 30 and 36 as an example, the invention is not limited to that. Other aspects of the disclosure include an airbag having more tethers and an airbag having no tether and provide the same advantages.

The invention has been described using the example of application to an airbag system using the gas generator 20 that generates high-temperature gas using powder. Non-limiting, the disclosed aspects may be applied to an airbag system using a gas generator that generates high-pressure gas such as argon, offers the same advantages.

The invention has been described using the example of application to a leg airbag system in which an airbag inflates forward of occupants' legs in a collision. Non-limiting, the disclosed embodiments may be applied to various airbag systems for restraining occupants' bodies in a car collision, such as a driver airbag system that inflates and deploys from the rotation center of the steering wheel toward a driver in a driver seat and a passenger airbag that inflates and deploys from an instrument panel toward the passenger seat.

The disclosure of Japanese Patent Application No. 2005-319876 filed on Nov. 2, 2005 is incorporated as a reference.

What is claimed is:

1. An airbag system comprising:
an airbag configured to restrain an occupant, and including a panel, and
a gas generator for generating a jet of gas to inflate the airbag, said gas generator having a gas generator end,
wherein the airbag includes a substantially circular insertion opening configured to receive the gas generator and having an opening area smaller than a cross section of the gas generator end to be inserted into the insertion opening, and the panel of the airbag is made of a flexible material such that the gas generator having the cross section greater than the opening area of the insertion opening can be inserted into the insertion opening by stretching the panel to thereby closely contact and tightly fit the panel onto the gas generator.

2. An airbag system according to claim 1, further comprising:
a gas generator ignition control cable connected to an end of the gas generator;
wherein the insertion opening is configured to allow the end of the gas generator to pass through for connecting to the gas generator ignition control cable.

3. An airbag system according to claim 1, wherein a periphery of the insertion opening is sewn up in a circle.

4. An airbag system according to claim 1, wherein said airbag further includes a slit for inserting the gas generator inside the airbag so that the end of the gas generator is inserted into the insertion opening from an inside of the airbag.

5. A knee airbag system comprising the airbag system according to claim 1.

6. An airbag system according to claim 1, wherein the diameter of the insertion opening is measured by a length of the insertion opening in a flatly developed state of the airbag.

7. An airbag system according to claim 1, wherein the insertion opening formed in the airbag has a peripheral length less than that of the gas generator.

8. An airbag system according to claim 1, wherein the airbag comprises a main panel forming a front panel and a rear panel, and a housing bag attached to the main panel and forming said panel with the insertion opening.

9. An airbag system according to claim 8, wherein said housing bag further includes a slit having a size greater than the cross sectional area of the gas generator so that the gas generator can be inserted into the airbag through the slit.

10. An airbag system comprising:
an airbag configured to restrain an occupant, and including a panel, and
a gas generator for generating a jet of gas to inflate the airbag,
wherein the airbag includes an insertion opening configured to receive the gas generator, an area of the insertion opening is smaller than a cross sectional area of the gas generator to be inserted, and the panel of the airbag is made of a material such that the gas generator having the cross sectional area greater than the area of the insertion opening can be inserted into the insertion opening to thereby closely contact the panel onto the gas generator,
wherein the airbag comprises a main panel forming a front panel and a rear panel, and a housing bag attached to the main panel and forming said panel with the insertion opening,
wherein said housing bag further includes a slit having a size greater than the cross sectional area of the gas generator so that the gas generator can be inserted into the airbag through the slit, and
wherein said airbag further comprises a protective fabric disposed between the housing bag and the rear panel, said protective fabric covering the slit after the gas generator is inserted into the airbag.

* * * * *